United States Patent
Stille et al.

(10) Patent No.: US 6,902,508 B2
(45) Date of Patent: Jun. 7, 2005

(54) HELICOPTER MAINSHAFT ASSEMBLY AND DRIVE ASSEMBLY INCLUDING THE SAME

(75) Inventors: Michael John Stille, Peachtree City, GA (US); Rex Iwaskow, Ontario (CA)

(73) Assignee: Clayton International, Inc., Peachtree City, GA (US)

( * ) Notice: Subject to any disclaimer, the term of this patent is extended or adjusted under 35 U.S.C. 154(b) by 0 days.

(21) Appl. No.: 10/464,408

(22) Filed: Jun. 18, 2003

(65) Prior Publication Data

US 2004/0259678 A1 Dec. 23, 2004

(51) Int. Cl.$^7$ ............................................. F16H 57/08
(52) U.S. Cl. ..................................... 475/331; 464/182
(58) Field of Search ...................... 475/331; 464/182; 416/132 R, 134, 170 R; 415/70, 122.1, 124.1

(56) References Cited

U.S. PATENT DOCUMENTS

| | | | |
|---|---|---|---|
| 4,326,834 A | * 4/1982 | Ostrowski | 416/134 A |
| 4,732,540 A | 3/1988 | Mouille et al. | 416/140 |
| 4,825,723 A | 5/1989 | Martin | 74/705 |
| 5,411,116 A | 5/1995 | Kish et al. | 184/6.12 |
| 5,421,656 A | 6/1995 | Chory et al. | 384/585 |
| 5,472,386 A | 12/1995 | Kish | 475/338 |
| 5,556,355 A | 9/1996 | Ostrowski | 475/332 |
| 5,797,185 A | 8/1998 | Sammataro et al. | 29/893.3 |
| 6,702,711 B2 | * 3/2004 | Zelikov et al. | 475/331 |

FOREIGN PATENT DOCUMENTS

| | | | |
|---|---|---|---|
| JP | 2000-72095 | * | 3/2000 |
| JP | 2001-130494 | * | 5/2001 |

OTHER PUBLICATIONS

Technical Manual with Illustrated Parts Breadown, Transmission System of Navy Model SH–3H, Nov. 1, 1989 (change 7—Dec. 15, 1992).

* cited by examiner

*Primary Examiner*—Ha Ho
(74) *Attorney, Agent, or Firm*—Myers Bigel Sibley & Sajovec, P.A.

(57) ABSTRACT

A helicopter mainshaft for use with a plurality of planet gear assemblies includes an elongated shaft having first and second opposed ends and a midsection located between the first and second ends. The shaft defines a shaft axis extending through the first and second ends. A planetary plate is unitarily formed with the shaft and extends radially outwardly from the midsection relative to the shaft axis. A plurality of gear openings are defined in the planetary plate, each of the gear openings being adapted to engage a respective one of the planet gear assemblies to operatively couple the planet gear assemblies to the shaft such that the planet gear assemblies can impart rotational forces to the shaft about the shaft axis.

41 Claims, 8 Drawing Sheets

HELICOPTER MAINSHAFT ASSEMBLY AND DRIVE ASSEMBLY INCLUDING THE SAME

FIELD OF THE INVENTION

The present invention relates to aircraft drive systems and, more particularly, to helicopter drive systems.

BACKGROUND OF THE INVENTION

Helicopters require drive systems to rotate one or more rotor assemblies to provide lift and other motive forces. According to some helicopter drive system designs, the drive system includes a mainshaft to transmit rotational force or torque from an engine to a rotor assembly. A mainshaft assembly 25 of this type is illustrated in FIG. 8. The mainshaft assembly 25 includes a shaft member 27 having an integral flange 29 extending radially outwardly a short distance. Axial holes 37 and 48 are formed in the flange 29. An upper planetary plate 31 is secured to the flange 29 by dowels 35 and bolts 44. More particularly, the bolts 44 extend through the holes 48 and aligned holes 46 in the plate 31. The dowels 35 extend through the holes 37 and into aligned bores (not shown) in the plate 31. A lower planetary plate 40 is secured to the upper planetary plate 31 by the bolts 44 such that the lower planetary plate 40 is suspended and spaced apart from the upper planetary plate 31 and does not engage the shaft 27. The planetary plates 31 and 40 have gear openings 33 and 42, respectively.

In use, a plurality of planet gear assemblies (not shown) are mounted between the planetary plates 31 and 40 such that a planet gear of each planet gear assembly is rotatably secured between a respective pair of opposed openings 33, 42. The planet gears are driven by a central sun gear (not shown) and react against a fixed ring gear (not shown) such that they impart a rotational force about the axis of the shaft 27. More particularly, the rotational force is transmitted through the upper planetary plate 31 to the flange 29 via the dowels 35. The holes 48 are enlarged so that the dowels 35 bear all of the rotational torque.

In use, the foregoing construction may experience component shifting, stress concentrations and crack propagation tending to induce fatigue at one or more critical locations. Such fatigue can shorten the effective service life of the mainshaft assembly. The mainshaft assembly serves a critical function in the helicopter and is typically a relatively expensive component to repair or replace. Accordingly, it is desirable to extend the service life of the mainshaft.

SUMMARY OF THE INVENTION

According to embodiments of the present invention, a helicopter mainshaft for use with a plurality of planet gear assemblies includes an elongated shaft having first and second opposed ends and a midsection located between the first and second ends. The shaft defines a shaft axis extending through the first and second ends. A planetary plate is unitarily formed with the shaft and extends radially outwardly from the midsection relative to the shaft axis. A plurality of gear openings are defined in the planetary plate, each of the gear openings being adapted to engage a respective one of the planet gear assemblies to operatively couple the planet gear assemblies to the shaft such that the planet gear assemblies can impart rotational forces to the shaft about the shaft axis.

According to further embodiments of the present invention, a helicopter mainshaft for use with a plurality of planet gear assemblies includes an elongated shaft having first and second opposed ends and a midsection located between the first and second ends. The shaft defines a shaft axis extending through the first and second ends. A planetary plate is unitarily formed with the shaft and extends radially outwardly from the midsection relative to the shaft axis. The planetary plate has an outer diameter of between about 23 and 25 inches.

According to further embodiments of the present invention, a helicopter mainshaft assembly for use with a plurality of planet gears includes a mainshaft. The mainshaft includes an elongated shaft having first and second opposed ends and a midsection located between the first and second ends. The shaft defines a shaft axis extending through the first and second ends. A first planetary plate is unitarily formed with the shaft and extends radially outwardly from the midsection relative to the shaft axis. A second planetary plate surrounds the shaft and is axially spaced apart from the first planetary plate. The mainshaft assembly is adapted to receive the plurality of planet gears between the first and second planetary plates such that the planet gears are rotatable relative to the first and second planetary plates and can impart rotational forces to the shaft through the first planetary plate.

According to further embodiments of the present invention, a helicopter drive assembly includes a mainshaft assembly including a mainshaft. The mainshaft includes an elongated shaft having first and second opposed ends and a midsection located between the first and second ends. The shaft defines a shaft axis extending through the first and second ends. A first planetary plate is unitarily formed with the shaft and extends radially outwardly from the midsection relative to the shaft axis. A second planetary plate surrounds the shaft and is axially spaced apart from the first planetary plate. A plurality of planetary gears is rotatably secured between the first and second planetary plates such that the planet gears can impart rotational forces to the shaft through the first planetary plate.

According to method embodiments of the present invention, a method for forming a helicopter mainshaft for use with a plurality of planet gear assemblies includes: unitarily forming an elongated shaft having first and second opposed ends, a midsection located between the first and second ends, the shaft defining a shaft axis extending through the first and second end, and a planetary plate extending radially outwardly from the midsection relative to the shaft axis; and forming a plurality of gear openings in the planetary plate, each of the gear openings being adapted to engage a respective one of the planet gear assemblies to operatively couple the planet gear assemblies to the shaft such that the planet gear assemblies can impart rotational forces to the shaft about the shaft axis.

Objects of the present invention will be appreciated by those of ordinary skill in the art from a reading of the figures and the detailed description of the preferred embodiments which follow, such description being merely illustrative of the present invention.

DETAILED DESCRIPTION OF THE PREFERRED EMBODIMENTS

Figure 1:
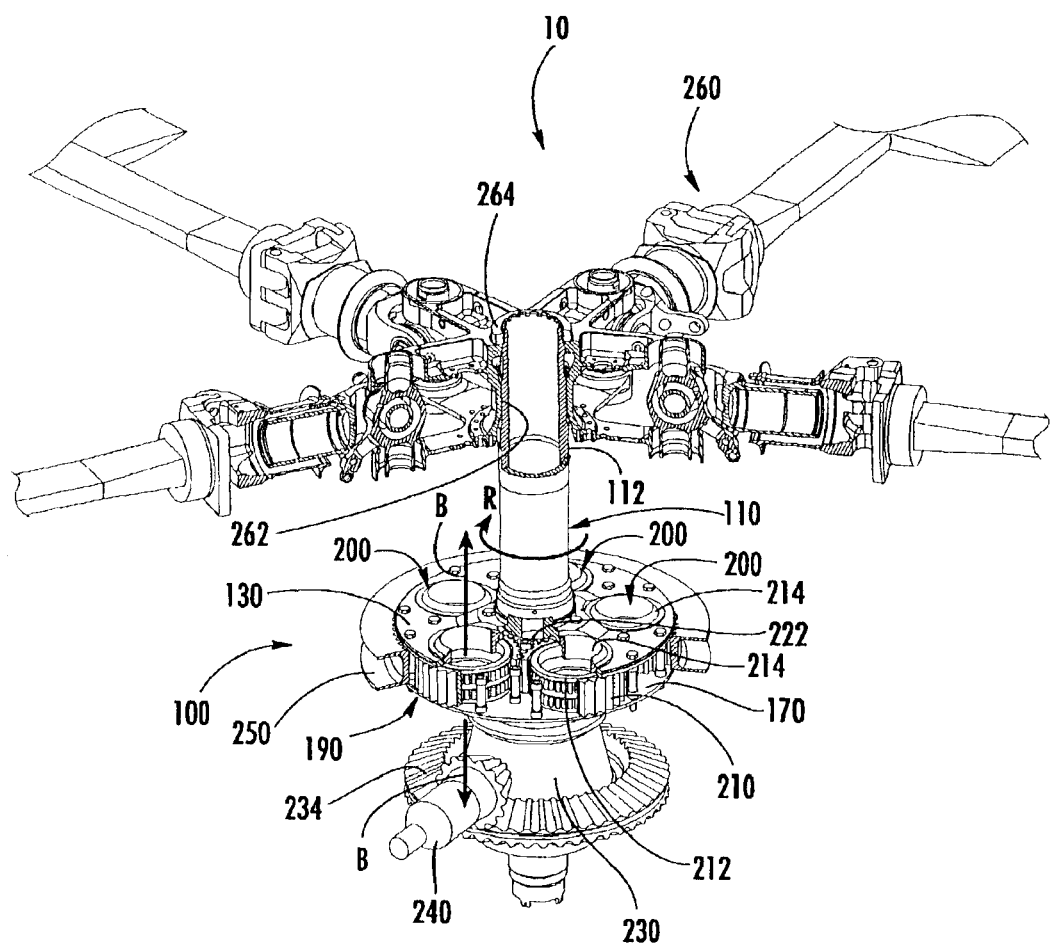
FIG. 1 is a partial, fragmentary, perspective view of a helicopter drive system according to embodiments of the present invention.

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the relative sizes of regions may be exaggerated for clarity. It will be understood that when an element such as a layer, region or substrate is referred to as being "on" another element, it can be directly on the other element or intervening elements may also be present. In contrast, when an element is referred to as being "directly on" another element, there are no intervening elements present.

Figure 2:
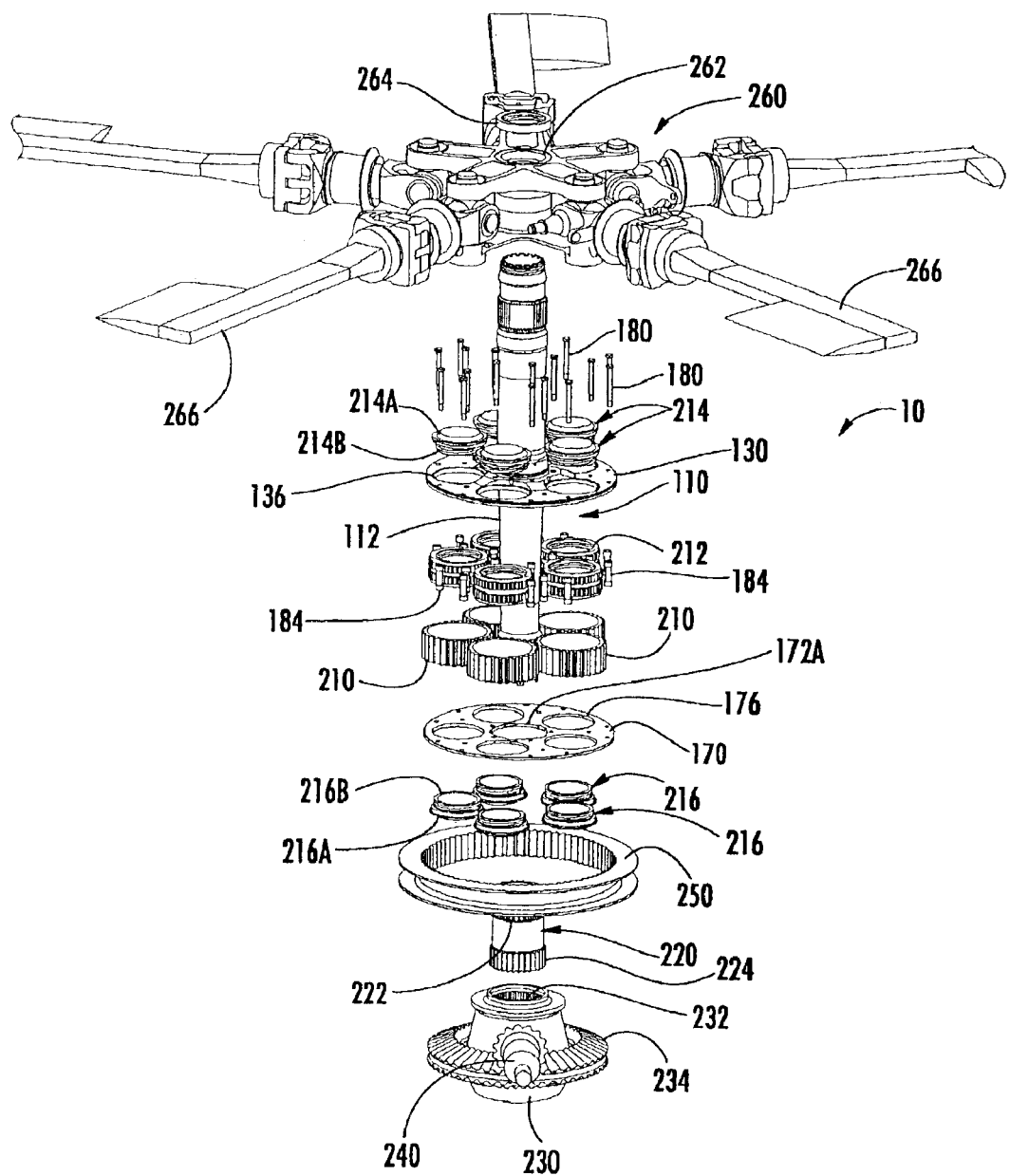
FIG. 2 is an exploded, fragmentary view of the drive system of FIG. 1.

With reference to FIGS. 1 and 2, a helicopter drive system 10 according to embodiments of the present invention is shown therein. The drive system 10 may be particularly suitable for use in a medium lift helicopter such as a Sikorsky H-3/S-61 helicopter. The drive system 10 includes a mainshaft assembly 100 according to embodiments of the present invention and as further shown in FIGS. 3 and 4. The drive system 10 further includes a plurality of planet gear assemblies 200, a sun gear 220, a lower shaft 230, a pinion 240, a ring gear 250, and a rotor head 260, and such components may be of conventional or any suitable construction. In conventional manner, the pinion 240 may be operatively connected to one or more engines to rotatively drive the pinion 240 about a generally horizontal axis.

As discussed in more detail below, the drive system 10 is configured such that rotation of the pinion 240 is transmitted to rotate planet gears 210 of the planet gear assemblies 200, which react against the ring gear 250 to in turn impart rotational forces or transmit torque to the mainshaft assembly 100. The ring gear 250 may be fixed relative to the body of the helicopter so that the rotor head 260 is thereby rotated relative to the helicopter body. The drive system 10 may be configured to transmit torque from the engine(s) to the rotor head 260 through an elongated shaft 112 of the mainshaft assembly 100 while reducing or eliminating lateral forces on the shaft 112.

Figure 3:
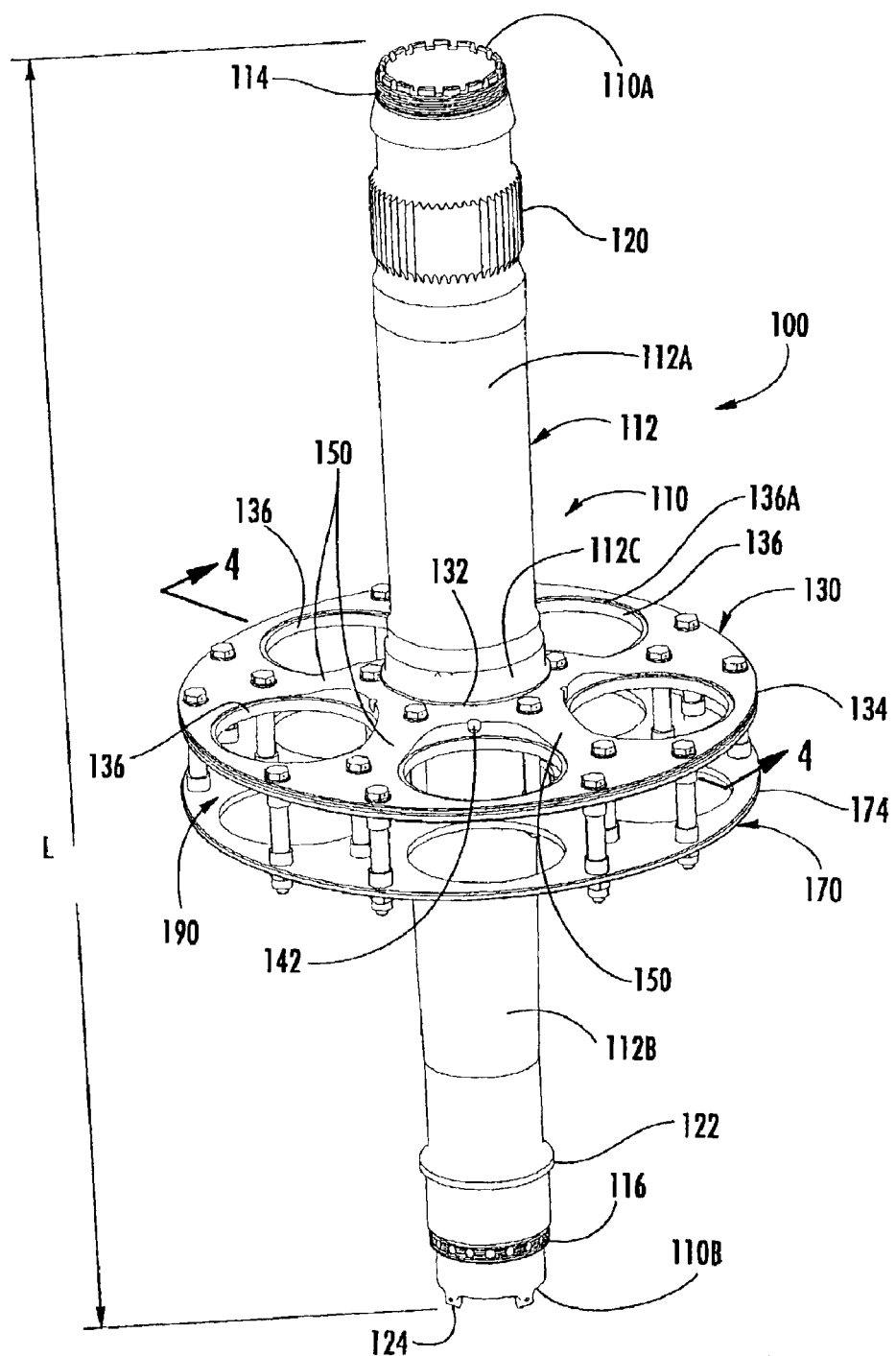
FIG. 3 is a top perspective view of a mainshaft assembly according to embodiments of the present invention and forming a part of the drive system of FIG. 1.
Figure 4:
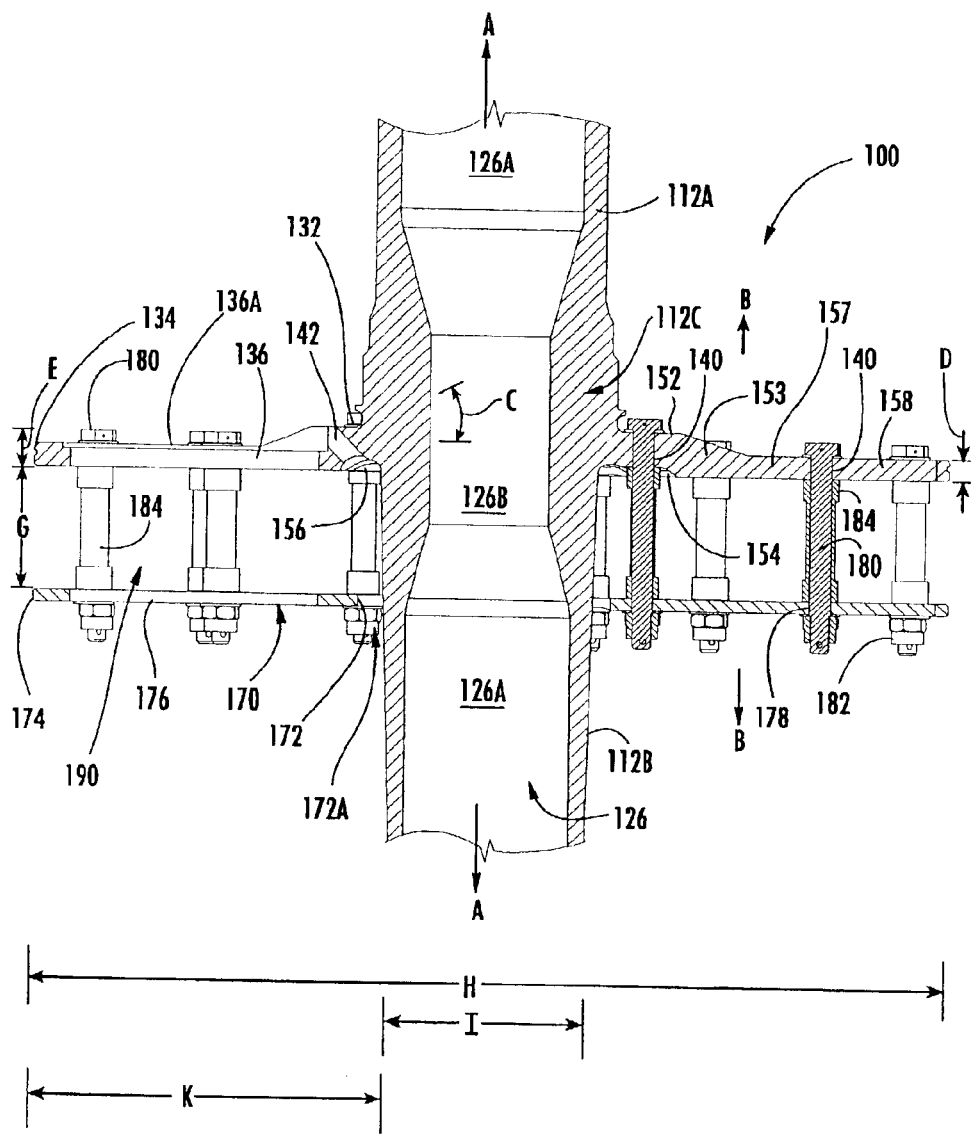
FIG. 4 is a fragmentary, enlarged, cross-sectional view of the mainshaft assembly of FIG. 3 taken along the line 4—4 of FIG. 3.
Figure 5:
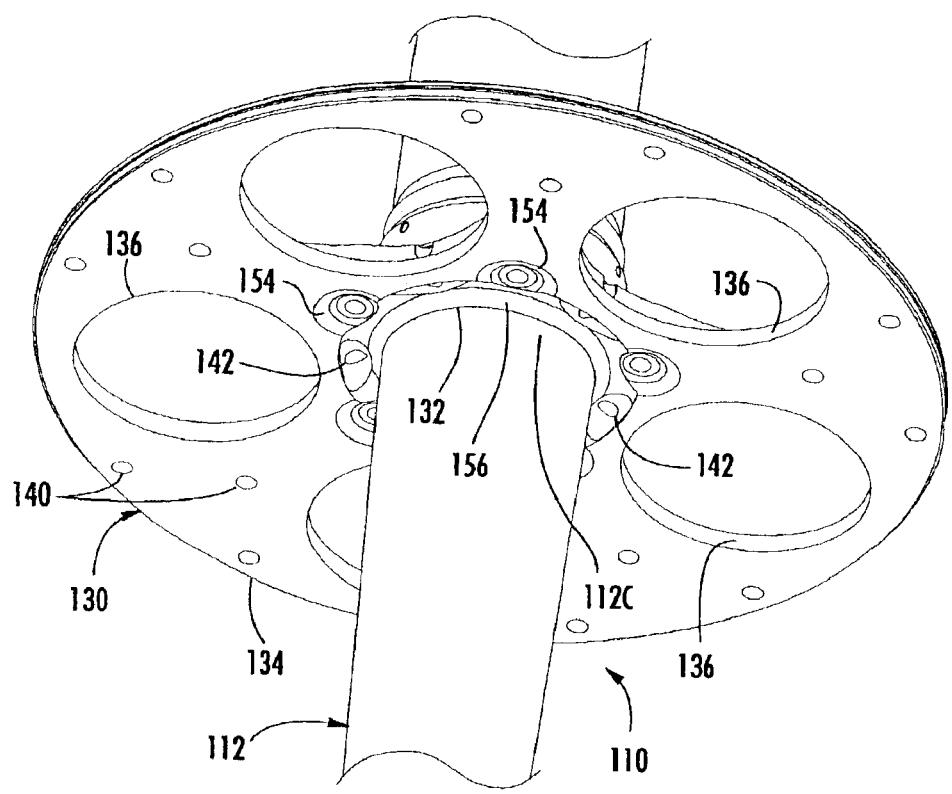
FIG. 5 is a fragmentary, enlarged, bottom perspective view of a mainshaft according to embodiments of the present invention and forming a part of the mainshaft assembly of FIG. 3.

With reference to FIGS. 3–5, the mainshaft assembly 100 includes a mainshaft 110 according to embodiments of the present invention, a lower planetary plate 170, a plurality of bolts 180, a plurality of nuts 182, and a plurality of rigid spacers 184. The mainshaft 110 includes generally the shaft 112 and an upper planetary plate 130 secured to the shaft 112. As discussed in more detail below, the upper planetary plate 130 is integrally and unitarily formed with the shaft 112. According to certain preferred embodiments, the upper planetary plate 130 is unitarily forged with the shaft 112.

Turning to the mainshaft 110 in more detail, the shaft 112 includes a shaft upper section 112A, a shaft lower section 112B and a shaft midsection 112C. The upper section 112A extends to a first end 110A of the mainshaft 110 and the lower section 112B extends to a second end 110B of the mainshaft 110. The mainshaft 110 defines a central shaft axis A–A (FIG. 4) extending through each of the ends 110A, 110B. Helical threads 114, 116 are formed about the shaft 112 adjacent either end 110A, 110B. The threads 114 are adapted to secure the rotor head 260 as discussed below. The threads 116 may engage a rotatable collar (not shown) in a helicopter gearbox (not shown). A lip 122 is provided to rest on a ledge (not shown) of the helicopter gearbox, for example. Projections 124 extend from the lower end of the shaft 112 to engage a journal bearing in the bottom of the gearbox. As shown in FIG. 4, a passage 126 extends through the shaft 112 from end 110A to end 10B. The passage 126 has enlarged upper and lower portions 126A in the sections 112A, 112B, and a reduced portion 126B in the midsection 112C. Splines 120 are provided to engage the rotor head 260. According to some preferred embodiments, the shaft 112 has a length L (FIG. 3) of between about 55 and 56 inches.

As discussed above, the upper planetary plate 130 is integrally and unitarily formed with the midsection 112C of the shaft 112. The upper planetary plate 130 extends from an inner periphery 132 that engages the shaft 112 to an outer periphery 134. According to preferred embodiments and as shown, the upper planetary plate is disposed in or extends along a plane normal to the shaft axis A–A. With reference to FIG. 4, the upper planetary plate 130 includes an inner portion 152 adjacent the inner periphery 132, an outer portion 158 adjacent the outer periphery 134, and transitional portions 153 between the portions 152 and 158 and joining the outer portion 158 at interface locations 157. A circumferential groove 156 is formed in the underside of the inner portion 152 substantially immediately adjacent the midsection 112C to provide clearance for the sun gear 220. Recesses 154 are also formed in the underside of the inner portion 152 to receive certain of the spacers 184.

A plurality of gear openings 136 are formed in the upper planetary plate 130 and define legs 150 (each including one of the transitional portions 153) therebetween. According to some preferred embodiments, the gear openings 136 are uniformly spaced about the upper planetary plate 130. According to some preferred embodiments, the center points of the openings 136 are positioned equidistant from the shaft axis A–A. According to some preferred embodiments, the interface locations 157 and the center points of the openings 136 are radially equidistant from the shaft axis A–A (i.e., an imaginary circle concentric with the shaft axis A–A can be drawn that extends through each of the interface locations 157 and the center points of the openings 136). The center points of the openings 136 correspond to the rotational axes A–A (FIGS. 1 and 4) of the planet gears 210 as discussed below. A circumferential relief groove 136A surrounds each opening 136. According to some embodiments, each of the gear openings 136 has a diameter of between about 6 and 7 inches.

The transitional portions 153 are tapered in a radially outward direction. According to some embodiments and as illustrated, the lower surface of each transitional portion 153 is substantially flat while the upper surface is sloped. According to some preferred embodiments, the upper surface of each transitional portion 153 is sloped at an angle C (FIG. 4) of between about 15° and 18°.

According to some embodiments, the maximum thickness D (FIG. 4) of the outer portion 158 is between about 0.5 and 0.7 inch. According to some embodiments, the maximum thickness E (FIG. 4) of the inner portion 152 is between about 1.1 and 1.3 inches. According to some preferred embodiments, the maximum thickness D of the outer portion 158 is between about 150 and 260% of the maximum thickness E of the inner portion 152.

According to some embodiments, the outer diameter H (FIG. 4) of the upper planetary plate 130 is at least 23 inches. According to some preferred embodiments, the outer diameter H is between about 23 and 25 inches. More particularly, the outer diameter H may be between about 24 and 24.5 inches. According to some embodiments, the maximum diameter I of the midsection 112C is between about 2.75 and 3.5 inches. According to some embodiments, the width K of the upper planetary plate 130 (i.e., the distance from the inner periphery 132 to the outer periphery 134) is between about 8.25 and 9.5 inches.

A lubricant port 142 is located in the inner portion 152 at each opening 136. Each port 142 extends radially inwardly from the upper surface of the upper planetary plate 130 to the lower surface of the upper planetary plate 130 as best seen in FIG. 4. According to some embodiments of the present invention, each of the lubricant ports 142 forms an angle of between about 44° and 46° with respect to the shaft axis A–A.

A plurality of bolt holes 140 are formed in the upper planetary plate 130. According to some embodiments, the holes 140 are sized such that the diameter of each is greater than the diameters of the shanks of the bolts 180 so that each bolt 180 can move freely in its bolt hole 140. According to some embodiments, the diameter of each hole 140 is between about 0.0064 and 0.0078 inch greater than the diameter of the received portion of the shank of the associated bolt 180.

The lower planetary plate 170 has an inner periphery 172 and an outer periphery 174. The inner periphery 172 is greater than the adjacent outer diameter of the shaft 112 so that a circumferential gap 172A is defined between the shaft 112 and the lower planetary plate 170. According to some embodiments, the gap 172A has a width of between about 0.8 and 0.7 inch. The outer diameter of the lower planetary plate 170 can be substantially the same as the outer diameter H of the upper planetary plate 130.

A plurality of gear openings 176 are formed in the lower planetary plate 170 and are each vertically aligned with respect to one of the openings 136.

A plurality of bolt holes 178 are formed in the lower planetary plate 170 and are each vertically aligned with the respective one of the bolt holes 140. According to some embodiments, the holes 178 are sized such that their diameters are greater than the diameters of the corresponding bolt 180 so that the bolt 180 can move freely in its respective hole 178.

The lower planetary plate 170 is secured to and suspended from the upper planetary plate 130 by a plurality of bolts 180 and nuts 182 that extend through respective pairs of the holes 140, 178. A predetermined vertical spacing is maintained between the plates 130 and 170 by the spacers 184, each of which surrounds a respective one of the bolts 180. In this manner, the plates 130 and 170 are spaced apart to provide a chamber 190 therebetween. According to some embodiments of the present invention, the height G (FIG. 4) of the chamber 190 is between about 3.0 and 3.5 inches.

The mainshaft 110 and the lower planetary plate 170 may be formed of any suitable material or materials. According to some preferred embodiments, the mainshaft 110 and the lower planetary plate 170 are formed of steel. According to some preferred embodiments, the mainshaft 110 and the lower planetary plate 170 are formed of 4340 steel (AMS 6164). The spacers 184 may be formed of an alloy steel meeting the requirements of AMS 6414, for example.

The construction of the drive system 10 will now be more fully discussed with reference to FIGS. 2 and 3. The planet gear assemblies 200 are mounted in the chamber 190 of the mainshaft assembly 100. Each planet gear assembly 200 includes a roller bearing 212 and a planet gear 210 surrounding the roller bearing 212. Each planet gear assembly 200 further includes an upper cap 214 having upper and lower portions 214A and 214B, and a lower cap 216 having upper and lower portions 216A and 216B. The lower portions 214B, 216B extend through the openings 136 and 176 to secure the roller bearings 212. The upper portions 214A and 216A are enlarged with respect to the openings 136, 176. In this manner, the planet gears 210 are secured between the plates 130 and 170 such that they may be freely rotated about their respective rotational axes B–B.

As noted above, the pinion 240 may be driven by one or more engines. Rotation of the pinion 240 is converted to rotation of the lower shaft 230 about a vertical axis (such as the shaft axis A–A) by a bevel gear 234, which is affixed to the lower shaft 230. The sun gear 220 is seated in the lower shaft 230 such that lower teeth 224 (FIG. 2) of the sun gear 220 engage inner teeth 232 (FIG. 2) of the lower shaft 230. Torque from the lower shaft 230 is thereby transmitted to the sun gear 220.

The sun gear 220 is tubular and is fitted over the shaft 112 such that the sun gear 220 can be freely rotated relative to the shaft 112 about the shaft axis A–A. An upper portion of the sun gear 220 having outwardly facing teeth 222 (FIGS. 1 and 2) is received in the chamber 190 between the planet gears 210. More particularly, as best seen in FIG. 1, the teeth 222 simultaneously operatively engage the teeth of each of the planet gears 210 such that rotation of the sun gear 220 in turn rotates each of the planet gears 210.

The teeth of each of the planet gears 210 also operatively engage the ring gear 250, which surrounds the planet gears 210 and the chamber 190. The ring gear 250 is fixed to a gearbox or other portion of the helicopter secured to the chassis or body. Accordingly, as the planet gears 210 are rotated by the sun gear 220, the planet gears 210 roll along the ring gear 250. In this manner, the planet gears 210 reactively impart a rotational force or torque to the upper planetary plate 130 about the axis A–A. The rotational force or torque is transmitted to the shaft 112 by the engagement between the upper planetary plate 130 and the shaft 112.

The shaft 112 is received in a hub 262 of the rotor head 260 such that the vertical splines 120 of the mainshaft assembly 100 operatively mate with complimentary inner teeth in the hub. A nut 264 is screwed onto the threads 114 to secure the rotor head 260 to the shaft 112. Accordingly, rotation of the shaft 112 serves to rotate the rotor head 260 (e.g., in a direction R as indicated in FIG. 1), which has rotors 266.

The lubricant ports 142 serve to provide a lubricant and/or coolant such as oil to the interface between the sun gear 220 and the shaft 112. More particularly, a plurality of jets or nozzles (not shown) may be provided above the upper surface of the upper planetary plate 130. The nozzles continuously or intermittently spray the lubricant downwardly and inwardly toward the shaft 112 and at or above the sun gear 220. According to some preferred embodiments, the angle of the lubricant ports 142 is substantially the same as the direction of spray. As the mainshaft assembly 100 rotates, the lubricant ports 142 momentarily align with the spray nozzles so that the sprayed lubricant is directed through the lubricant ports 142 and onto the shaft 112 above, at or near the top of the sun gear 220. In this manner, the lubricant can be supplied to the teeth of the planet gears 210 and the sun gear 220 and/or between the sun gear 220 and the shaft 112. Moreover, the lubricant can thereby be indirectly provided to the ring gear 250.

As will be appreciated from the description herein, substantial amounts of torque may be transmitted through the upper planetary plate 130 to the shaft 112. The unitary formation of the shaft 112 and the upper planetary plate 130 can provide a stronger, more durable joinder. As a result, the service life of the mainshaft 110 may be extended. The improved strength and durability may result from an increase in the area of engagement between the upper planetary plate 130 and the shaft 112, as well as from a reduction in the number and severity of stress concentration locations or features. By reducing the stress profile in the mainshaft assembly 100 between the upper planetary plate 130 and the shaft 112 and distributing the torque load more uniformly and over a greater area, the tendencies for crack propagation, twisting, cocking, or other failure modes can be reduced.

The increased thickness of the inner portion 152 and the transitional portions 153 can also serve to improve the strength and durability of the mainshaft 110 without undue weight. The torque loading of the upper planetary plate 130 increases radially inwardly from the radial position of the aforementioned imaginary circle extending through the planet gear axes B–B. The transitional portions 153 accommodate this increase in torque load and attendant stresses by likewise increasing the thickness of the upper planetary plate 130 radially inwardly. According to some embodiments, the increase in thickness is substantially proportional to the increase in torque loading.

Figure 6:
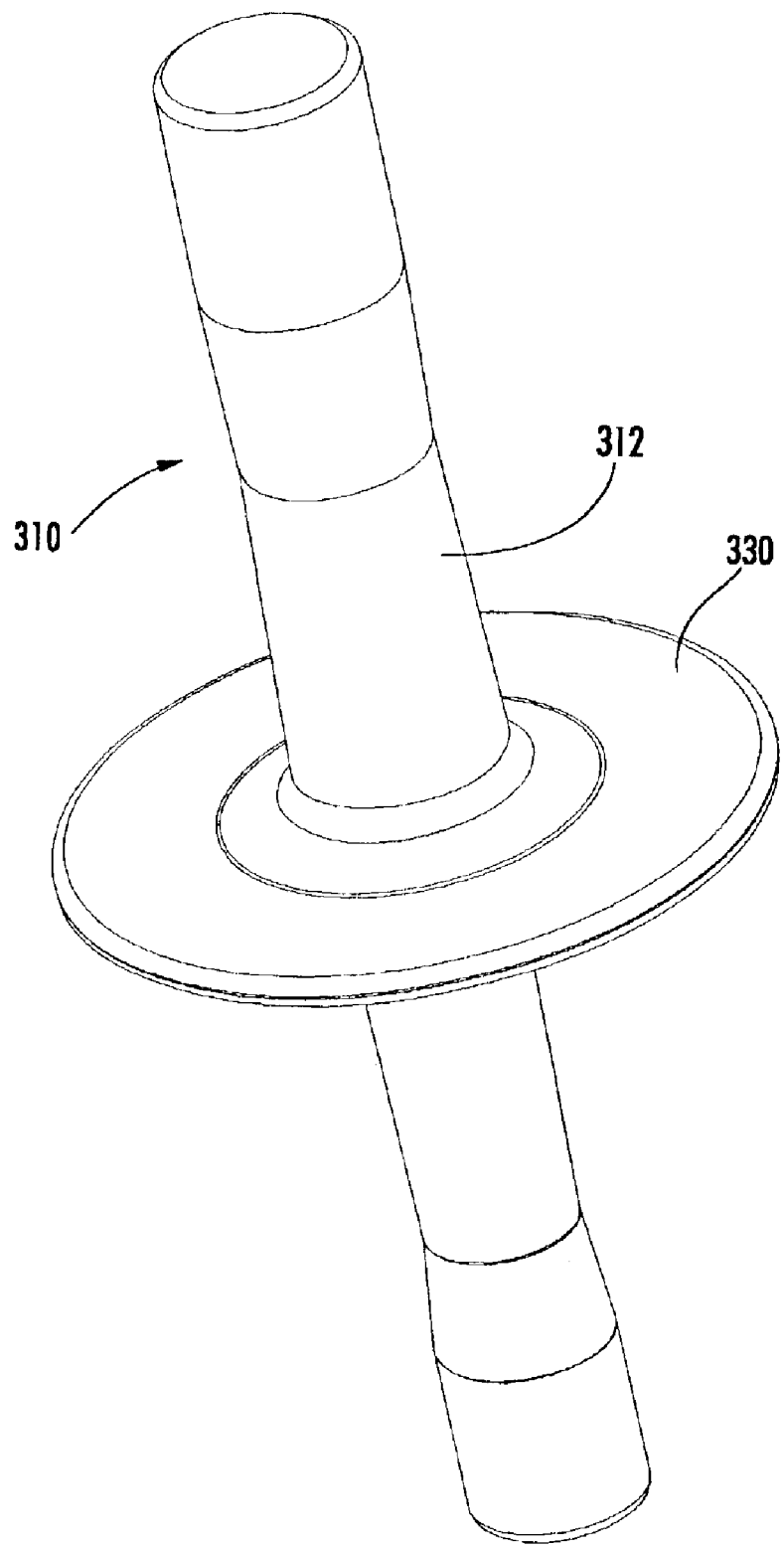
FIG. 6 is a top perspective view of a forging for forming the mainshaft of FIG. 5.

According to embodiments of the present invention, the mainshaft 110 may be formed using the following method. The mainshaft 110 may be formed using a roll formed forging process. A rod shaped billet of suitable material (such as described above) of about one foot in diameter is clamped at each end. The billet is heated above the re-crystallization state and maintained in this state. Rollers are run over the billet, for example, in suitable helical paths to displace portions of the billet material to form cylindrical features on the rod. Forming the billet while hot may serve to promote parallelness of the grains in the outer surface of the resulting forge so that the grains flow around corners to provide improved strength and a reduction in stress concentrations. This process is continued until a forging 310 as shown in FIG. 6 is created. The forging 310 includes a shaft 312 corresponding generally to the shaft 112 and a flange 330 corresponding generally to the upper planetary plate 130.

Figure 7:
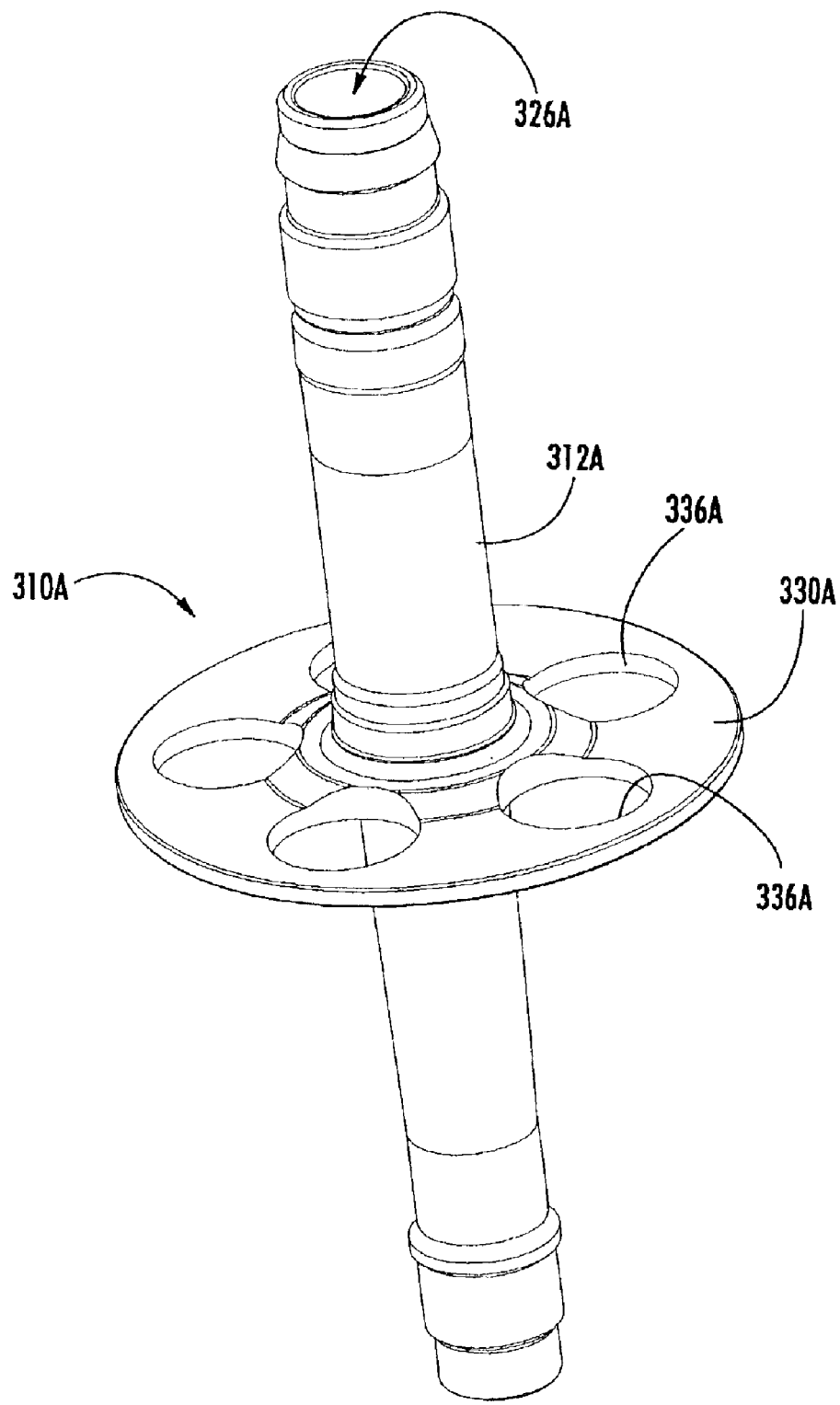
FIG. 7 is a top perspective view of a partially machined forging for forming the mainshaft of FIG. 5.
Figure 8:
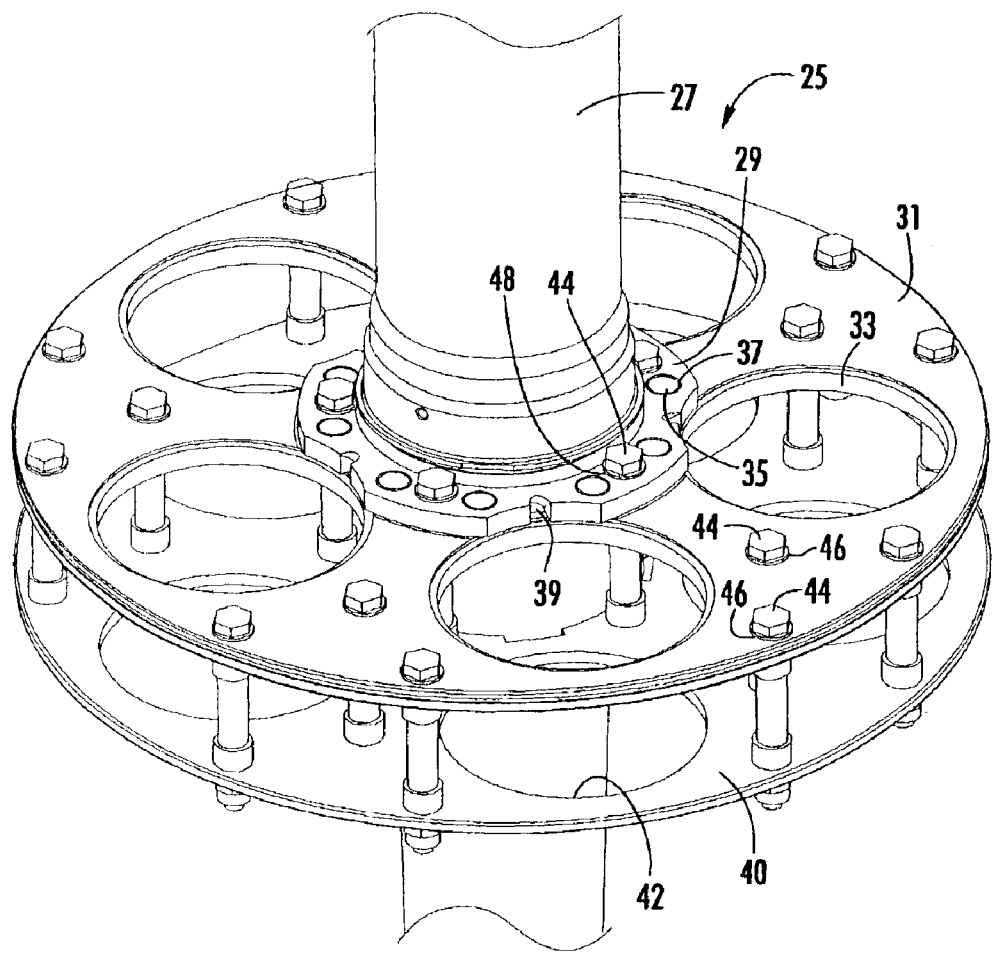
FIG. 8 is a fragmentary, enlarged, top perspective view of a mainshaft assembly according to the prior art.

Thereafter, various machining processes may be executed on the forging 310 to form a machined forging 310A as shown in FIG. 7. In particular, a passage 326A corresponding generally to the passage 126 may be milled or honed out of the forging 310, openings 336A corresponding generally to the openings 136 may be machined in the flange 330, and various other flanges and the like may be machined into the shaft 312 to form a shaft 312A more similar to the shaft 112.

The machined forging 310A is heat treated by heating to a suitable temperature (e.g., between about 840° F. and 860° F.) and quenching. According to some embodiments, it is preferable to machine as discussed above to reduce thickness of the metal prior to quenching to improve the effectiveness of the quenching step.

Thereafter, further and final machining may be conducted to form further features and improve earlier formed features. Such further machining may include further grinding, cutting of gears/splines, cutting the bolt holes 140, and shot peening the groove 156.

According to some preferred embodiments, the mainshaft 110 is adapted such that, when a pure torsional load of 200,000 inch-pounds-force is applied about the shaft axis A–A to the upper shaft section 112A and reacted evenly at each of the gear openings 136 (i.e., at each of the locations of the five planet gears 210), the material Von Mises principle stress in the upper planetary plate 130, along a section cut defined by an infinite plane passing through the rotational or centerline axis B–B of any planet gear 210 and passing through the centerline of the shaft 112, will not exceed 30,000 pounds per square inch (i.e., 15% of a shaft material ultimate tensile allowable stress of 200,000 pounds per square inch).

While the mainshaft assembly 100 and mainshaft 110 are described above in relation to a drive system 10, it will be appreciated that the mainshaft assembly 100 and mainshaft 110 (as well as other mainshaft assemblies and mainshafts in accordance with the present invention) can be used in drive systems of other types and configurations. The mainshaft 110 (and other mainshafts in accordance with the invention) can be incorporated into mainshaft assemblies other than the mainshaft assembly 100. Moreover, drive systems in accordance with the present invention may omit various of the components discussed above and/or may include additional suitable components.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A helicopter mainshaft assembly for use with a plurality of planet gears, the mainshaft assembly comprising:
   a) a mainshaft including:
      1) an elongated shaft having first and second opposed ends and a midsection located between the first and second ends, the shaft defining a shaft axis extending through the first and second ends; and
      2) a first planetary plate unitarily formed with the shaft and extending radially outwardly from the midsection relative to the shaft axis, wherein the first planetary plate includes an outer portion and an inner portion interposed between the outer portion and the shaft, and wherein the outer portion is unitarily formed with the shaft; and
   b) a second planetary plate surrounding the shaft and axially spaced apart from the first planetary plate;
   c) wherein the mainshaft assembly is adapted to receive the plurality of planet gears between the first and second planetary plates such that the planet gears are rotatable relative to the first and second planetary plates and can impart rotational forces to the shaft through the first planetary plate.

2. The mainshaft assembly of claim 1 wherein each of the first and second planetary plates has an outer periphery and the mainshaft assembly is adapted to receive the planet gears such that the planet gears are disposed within the outer peripheries of the first and second planetary plates.

3. The mainshaft assembly of claim 1 including a plurality of gear openings defined in the first planetary plate, each of the gear openings being adapted to receive a respective gear mount member therethrough to engage a respective one of the planet gears to secure the planet gears between the first and second planetary plates.

4. The mainshaft assembly of claim 1 including a plurality of bolts connecting the first planetary plate to the second planetary plate.

5. The mainshaft assembly of claim 4 including a plurality of spacers, each of the spacers being mounted on a respective one of the bolts to maintain a spacing between the first and second planetary plates.

6. The mainshaft assembly of claim 4 wherein the second planetary plate is not directly secured to the shaft.

7. The mainshaft assembly of claim 1 wherein the inner portion has a thickness greater than a corresponding thickness of the outer portion.

8. The mainshaft assembly of claim 7 wherein the thickness of the inner portion is between about 1.1 and 1.3 inches and the thickness of the outer portion is between about 0.5 and 0.7 inch.

9. The mainshaft assembly of claim 7 wherein the first planetary plate further includes a transitional portion interposed between the outer portion and the inner portion, the transitional portion having a thickness that tapers with a radial distance from the inner portion.

10. The mainshaft assembly of claim 9 wherein an interface between the transitional portion and the outer portion is located at a distance from the shaft axis that is substantially the same as a distance from the shaft axis to a rotational center of at least one of the planet gears when the planet gear is mounted in the mainshaft assembly.

11. The mainshaft assembly of claim 1 wherein the first planetary plate bas upper and lower opposed sides, and the mainshaft assembly further includes a lubricant port extending through the first planetary plate from the upper side to the lower side.

12. The mainshaft assembly of claim 11 wherein the lubricant port extends radially inwardly from the upper side to the lower side.

13. The mainshaft assembly of claim 1 wherein the shaft and the first planetary plate are formed of steel.

14. The mainshaft assembly of claim 1 wherein the shaft and the first planetary plate are formed of a unitary forging.

15. The mainshaft assembly of claim 1 wherein the first planetary plate has an outer diameter of between about 23 and 25 inches.

16. The mainshaft assembly of claim 15 wherein the shaft has a length of between about 55 and 56 inches.

17. The mainshaft assembly of claim 1 wherein the outer portion of the first planetary plate has an outer periphery and the mainshaft assembly is adapted to receive the planet gears such that the planet gears are disposed within the outer periphery.

18. The mainshaft assembly of claim 17 including a plurality of gear openings defined in the first planetary plate within the outer periphery, each of the gear openings being adapted to receive a respective gear mount member therethrough to engage a respective one of the planet gears to secure the planet gears between the first and second planetary plates.

19. The mainshaft assembly of claim 1 wherein the first planetary plate is unitarily fanned.

20. A helicopter drive assembly comprising:
a) a mainshaft assembly including:
1) a mainshaft including:
an elongated shaft having first and second opposed ends and a midsection located between the first and second ends, the shaft defining a shaft axis extending through the first and second ends; and
a first planetary plate unitarily formed with the shaft and extending radially outwardly from the midsection relative to the shaft axis, wherein the first planetary plate includes an outer portion and an inner portion interposed between the outer portion and the shaft, and wherein the outer portion is unitarily formed with the shaft; and
2) a second planetary plate surrounding the shaft and axially spaced apart from the first planetary plate; and
b) a plurality of planet gears rotatably secured between the first and second planetary plates such that the planet gears can impart rotational forces to the shaft through the first planetary plate.

21. The drive assembly of claim 20 wherein each of the first and second planetary plates has an outer periphery and the planet gears are disposed within the outer peripheries of the first and second planetary plates.

22. The drive assembly of claim 20 including:
a) a plurality of gear openings defined in the first planetary plate; and
b) a plurality of gear mount members each extending through a respective one of the gear openings to engage a respective one of the planet gears, wherein the gear mount members secure the planet gears between the first and second planetary plates.

23. The drive assembly of claim 20 including a plurality of bolts connecting the first planetary plate to the second planetary plate.

24. The drive assembly of claim 23 including a plurality of spacers, each of the spacers being mounted on a respective one of the bolts to maintain a spacing between the first and second planetary plates.

25. The drive assembly of claim 23 wherein the second planetary plate is not directly secured to the shaft.

26. The drive assembly of claim 20 including a sun gear having a set of teeth interposed between the shaft and the plurality planet gears, the teeth being operatively engaged with teeth of the plurality of planet gears.

27. The assembly of claim 20 including a ring gear surrounding the plurality of planet gears, the ring gear having a set of teeth operatively engaged with teeth of the plurality of planet gears.

28. The drive assembly of claim 20 including a rotor head assembly secured to the first end of the shaft for rotation therewith about the shaft axis.

29. The drive assembly of claim 20 wherein the inner portion has a thickness greater than a corresponding thickness of the outer portion.

30. The drive assembly of claim 29 wherein the thickness of the inner portion is between about 1.1 and 1.3 inches and the thickness of the outer portion is between about 0.5 and 0.7 inch.

31. The drive assembly of claim 29 wherein the first planetary plate further includes a transitional portion interposed between the outer portion and the inner portion, the transitional portion having a thickness that tapers with a radial distance from the inner portion.

32. The drive assembly of claim 31 wherein an interface between the transitional portion and the outer portion is located at a distance from the shaft axis that is substantially the same as a distance from the shaft axis to a rotational center of at least one of the planet gears.

33. The drive assembly of claim 20 wherein the first planetary plate has upper and lower opposed sides, and the mainshaft assembly further includes a lubricant port extending through the first planetary plate from the upper side to the lower side.

34. The drive assembly of claim 33 wherein the lubricant port extends radially inwardly from the upper side to the lower side.

35. The drive assembly of claim 20 wherein the shaft and the first planetary plate are formed of steel.

36. The drive assembly of claim 20 wherein the shaft and the first planetary plate are formed of a unitary forging.

37. The drive assembly of claim 20 wherein the first planetary plate has an outer diameter of between about 23 and 25 inches.

38. The drive assembly of claim 37 wherein the shaft has a length of between about 55 and 56 inches.

39. The drive assembly of claim 20 wherein the outer portion of the first planetary plate has an outer periphery and the planet gears are disposed within the outer periphery.

40. The drive assembly of claim 39 including:
a) a plurality of gear openings defined in the first planetary plate within the outer periphery; and
b) a plurality of gear mount members each extending through a respective one of the gear openings to engage a respective one of the planet gears, wherein the gear mount members secure the planet gears between the first and second planetary plates.

41. The drive assembly of claim 20 wherein the first planetary plate is unitarily formed.

* * * * *

UNITED STATES PATENT AND TRADEMARK OFFICE
CERTIFICATE OF CORRECTION

PATENT NO. : 6,902,508 B2
DATED : June 7, 2005
INVENTOR(S) : Still et al.

It is certified that error appears in the above-identified patent and that said Letters Patent is hereby corrected as shown below:

<u>Column 10,</u>
Line 52, should read -- 27. The drive assembly of claim 20 including a ring gear --.

Signed and Sealed this

Twenty-fifth Day of October, 2005

JON W. DUDAS
*Director of the United States Patent and Trademark Office*